United States Patent
Held

[11] 3,868,235
[45] Feb. 25, 1975

[54] PROCESS FOR APPLYING HARD CARBIDE PARTICLES UPON A SUBSTRATE

[76] Inventor: Gerhard R. Held, Mt. Clemens, Mich.

[22] Filed: July 19, 1973

[21] Appl. No.: 380,779

Related U.S. Application Data

[63] Continuation-in-part of Ser. No. 155,299, June 21, 1971, abandoned, which is a continuation-in-part of Ser. No. 804,511, March 5, 1969, abandoned.

[52] U.S. Cl. .................................. 51/309, 51/293
[51] Int. Cl. ............................................ C04b 31/16
[58] Field of Search .................... 51/293, 295, 309

[56] References Cited
UNITED STATES PATENTS

| | | | |
|---|---|---|---|
| 2,906,612 | 9/1959 | Anthony et al. | 51/309 |
| 3,248,189 | 4/1966 | Harris | 51/309 |
| 3,496,682 | 2/1970 | Quaas | 51/293 |
| 3,517,464 | 6/1970 | Mattia et al. | 51/293 |
| 3,553,905 | 1/1971 | Lemelson | 51/295 |
| 3,615,309 | 10/1971 | Dawson | 51/309 |

*Primary Examiner*—Donald J. Arnold
*Attorney, Agent, or Firm*—Cullen, Settle, Sloman & Cantor

[57] ABSTRACT

A method for applying hard carbide particles to the surface of a metal substrate which eliminates functional copper from the matrix and results in an improved bond of the carbide particles. The process includes applying a copper-free molten matrix material to the substrate, applying a tacky organic adhesive over the matrix, sprinkling the carbide particles on the adhesive and baking the layered substrate in a non-oxidizing furnace at a temperature below the melting temperature of the substrate, but high enough to melt the matrix and essentially volatalize the adhesive.

7 Claims, 6 Drawing Figures

PATENTED FEB 25 1975						3,868,235

INVENTOR
GERHARD R. HELD

BY Cullen, Sloman, & Cantor
ATTORNEYS

PROCESS FOR APPLYING HARD CARBIDE PARTICLES UPON A SUBSTRATE

CROSS-REFERENCE TO RELATED APPLICATION

This application is a continuation-in-part of my co-pending United States patent application, Ser. No. 155,299 filed June 21, 1971, now abandoned, which in turn, is a continuation-in-part of my then copending United States patent application, Ser. No. 804,511 filed Mar. 5, 1969, and now abandoned.

BACKGROUND OF THE INVENTION

It is common to coat the cutting or abrasion surfaces of steel cutting or abrading tools with hard carbide particles both to increase the lives of such tools as well as to better perform their functions. In the past, cemented tungsten carbide particles, of varying sizes, depending upon the use of the tool, have been brazed to the tool base which is commonly referred to as the substrate.

One prior brazing technique has been to simply place a mixture of copper brazing compound particles and cemented hard carbide particles upon the substrate and to heat this in a furnace at a temperature sufficient to melt the brazing compound to cause it to flow around and adhere to the carbide particles for bonding to the substrate. This technique has been inapplicable where the substrate surfaces have been curved or at various angles relative to the horizontal.

Another technique commonly used has been to hot spray a mixture of particles of brazing compound and hard carbide particles upon the substrate which frequently has been pre-coated with brazing compound. This technique has been disclosed, for example, in U.S. Pat. No. 2,906,612 to Anthony, granted Sept. 29, 1959.

However, the use of copper brazing compounds has a number of drawbacks, particularly in that it forms a relatively weak bond between the carbide particles and the substrate due to the lack of strength of the brazing material as well as its low melting point. Thus, attempts have been made to utilize a stronger bonding material. Recently various bonding or matrix materials have become commercially available, these being in the form of stainless steel alloys containing nickel, or at times cobalt.

This commercially available matrix material is generally applied in hot spray form. For example, U.S. Pat. No. 3,248,189, granted to Haris on Apr. 26, 1966, discloses applying a matrix formed of a nickel-chromium-boron material by means of a hot spray to form a bonding layer. Thereafter, a mixture of the same material and the carbide particles is hot sprayed upon the bonding layer to thereby bond the carbide particles to the substrate. However, the carbide particles generally tend to oxidize excessively and tend to not stick to the molten matrix. Therefore, they frequently bounce off during spraying rather than adhering. Attempts have been made to avoid such oxidation by using a non-oxidizing form of spray means.

Since it is more difficult to wet the carbide particles with such types of commercially available matrix materials, further attempts have been made to use copper brazing material in conjunction therewith, the copper brazing material having a greater tendency to wet the carbide particles. An example of this technique is shown in the patent to Harris, U.S. Pat. No. 3,378,361 granted Apr. 16, 1968, wherein the substrate is first hot sprayed with the matrix layer to form a bonding layer and thereafter a small amount of copper brazing material is spray applied, in molten form, to the matrix layer, generally at the same time as the carbide particles are sprayed thereon. By limiting the quantity of copper braze, the bond formed is thus a copper braze plus matrix bond to thereby strengthen the bond between the carbide particles and the substrate. Here, the quantity of copper braze present must be carefully controlled since too much will result in an overly weak bonding and too little will result in the particles stripping off. Either way, careful control is required and in addition, the bond is still relatively weak and only thin layers of carbide particles are applied.

Thus, the two principal drawbacks of the presently available techniques for coating substrates with carbide particles are that where any copper braze is used, the bond tends to be weak and only thin layers of carbide can be applied. Where a non-copper matrix is used, oxidation of the carbide particles makes them difficult to apply.

Thus, the invention herein is concerned with a process which substantially eliminates the problems described above in the prior and presently used coating processes.

SUMMARY OF INVENTION

The steps in the process of this invention comprise first heat spraying a non-copper matrix in molten form upon the substrate, without avoiding oxidation thereof, but rather increasing the normal oxide contents of the matrix, as by using a conventional oxygen-acetylene torch. Next, after cooling the matrix, a tacky adhesive is applied, such as a glycerine-water mixture. Then the carbide particles are loosely sprinkled upon the surface to form a layer of desired thickness and the article is then baked in a non-oxidizing atmosphere furnace for a sufficient time to melt the matrix and cause it to bond to the carbide particles, but not long enough to completely deoxidize the matrix.

The problems arising out of the use of copper braze are eliminated, since none is used.

Preferably the adhesive is one which crystalizes under the baking heat so as to create porosity in the solidified matrix. Porosity is also caused by the slower melting matrix oxides, which oxides additionally form a harder matrix. Such matrix porosity provides a better carbide cutting or abrading surface and thus is desirable here.

Oxidation of the carbide particles, which is undesirable since it tends to adversely affect their cutting properties, is avoided as the particles are applied cold rather than by a hot spray distribution.

These and further objects and advantages of this invention will become apparent upon reading the following description, of which the attached drawings form a part.

BRIEF DESCRIPTION OF THE DRAWINGS

The figures of the drawings show the successive steps in the process herein as follows.

DETAILED DESCRIPTION OF THE INVENTION

The substrate 10 may consist of a conventional metal cutting or abrading tool, such as a saw blade, teeth of a hobbing wheel or milling cutter, a broaching tool, a surface smoothing abrading tool, and the like. Generally, the cutting edge or surface or abrading surface of the tool, which is normally made of a steel material, is to be coated to a predetermined thickness with particles of cemented hard carbides, such as tungsten carbide.

As those skilled in the art will appreciate, there are many relatively hard metals which are conventionally used as the substrate for tools and dies. Softer metals including gold, silver, aluminum, copper, brass and zinc are not used for tool substrates. Furthermore, the substrate must have a melting point above the melting point of the matrix. Thus, the lowest melting point of the substrate should be above 2,200°F. for use with a metal matrix of the group suggested hereinafter.

The first step in the process herein, as in the past, is to clean the surface to be coated by various conventional cleaning processes to remove foreign material, dirt, grease, previous coatings, etc. It is also conventional to rough the surface to some extent as by abrading it or bombarding it with a spray of hardened particles. This is to improve the mechanical interlock between the bonding matrix and the substrate surface.

Figure 1:
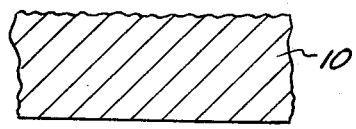
FIG. 1 illustrates the substrate after the first step of suitably cleaning and roughening the substrate surface.
Figure 2:
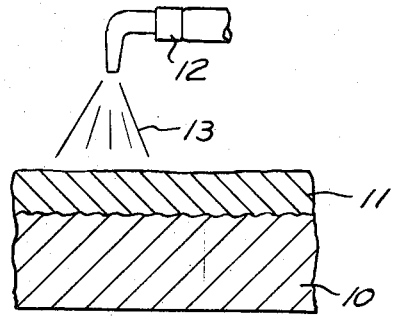
FIG. 2 shows the step of heat spraying the matrix bonding layer upon the substrate.

Once the material has been suitably cleaned and roughened, a matrix or bonding layer 11 is applied thereto, preferably by using a hot spray technique. For example, FIG. 2 illustrates spraying molten bonding layer 11 by means of a spray torch 12 producing a hot spray 13. Various conventional flame spray or metallizing guns are available for this purpose. A convenient and inexpensive spray gun is a simple oxygen-acetylene torch into whose flame particles of the matrix are blown for melting and applying the particles in a uniform layer upon the substrate. This further oxidizes the matrix, adding to already present oxides.

Commercially available matrix materials are usually in the form of a nickel-chromium alloy, as for example, a material sold by Alloy Metals, Inc. of Troy, Michigan under the name, "Amdry - 750." The nominal composition of Amdry - 750, by weight, is as follows:

| | |
|---|---|
| Silicon | 4% |
| Chromium | 16.5% |
| Iron | 4% |
| Boron | 3.8% |
| Nickel | Remainder. |

Another suitable matrix material is available under the trade name "Metco" Thermo Spray Powder No. 15F, a nickel-chromium alloy whose analysis is described on page 8 of a pamphlet entitled "The Metco Flame Spraying Process" published by Metallizing Engineering Company, Inc., Westbury, New York in 1960 and described in the above reference, U.S. Pat. No. 3,378,361. The melting point range of such alloy is approximately 1,950°F. to about 2,050°F. The melting point of the Amdry - 750 powder described above is in the range of 1,950°F. to 2,000°F.

The important characteristics of the metal matrix are (a) copper-free, (b) having melting point around 2,000°F., plus or minus 100°F. (i.e., nominally at least 200°F. below the melting point of the substrate), and (c) exhibiting a flow capability (capillary action). Flow capability is a characteristic of the molten matrix wherein the matrix forms a thin film or covering over the carbide during the "baking" or volatalization of the binder.

This is an important feature in that the carbides are not deeply embedded in the matrix. Thus, after some use of the cutting tool, the thin film is eroded or worn and the benefit of the carbide coating is fully appreciated as the matrix "holds" the carbide in place. Absent this feature, the carbides are totally embedded and "fall out" upon the wearing off of the matrix covering the carbide particles.

Metal matrix alloys exhibiting these several characteristics, including Amdry - 750 and Metco 15F are alloys consisting of one or more of the following: carbon, silicon, chromium, boron, iron, nickel, molybdenum, cobalt and tungsten.

For nickel base alloys, the percentage of nickel, by weight, usually exceeds 65 percent. For cobalt base alloys, the percentage of cobalt usually exceeds 40 percent and for tungsten carbide base alloys, the percentage of tungsten-carbide usually exceeds 30 percent although a pure tungsten (99.5 percent) matrix may be used.

Where an oxygen-acetylene torch is used to apply the matrix compound, there is a tendency of the material to oxidize to some extent, particularly at the exposed surfaces. Rather than following the prior art techniques of attempting to prevent such oxidation, the process herein creates more oxides.

Figure 3:
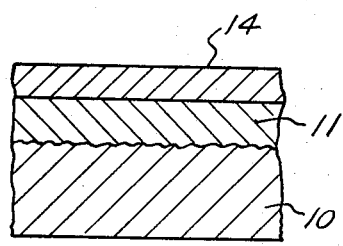
FIG. 3 illustrates the step of applying the temporary adhesive upon the cooled matrix.
Figure 4:
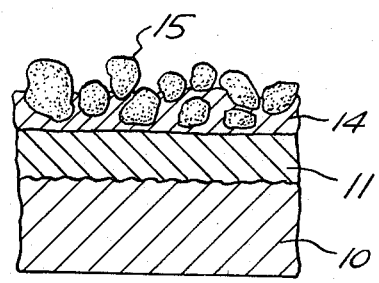
FIG. 4 shows the carbide particles applied to and held upon the matrix by the adhesive.

Once the matrix or bonding layer is applied, the material is cooled and then a layer 14 of an organic adhesive or bonding material is applied thereto, as shown in FIG. 3.

The particular type of organic adhesive or binder may vary considerably, but its principal function is to hold the later applied carbide particles in place temporarily. A second function is to assist in creating porosity in the matrix. Thus, the adhesive or binder must be tacky after application and preferably will crystallize upon the application of heat. An organic binder or adhesive which is essentially volatalized at the furnace temperature is also preferred.

The preferred organic adhesive at present for the process of this invention is a mixture of ordinary glycerine and water, applied in a liquid form. Glycerine tends to crystallize upon the application of heat, causing a porous condition in the matrix, and may recrystallize on the surface of the matrix. Other organic adhesive materials which have been found generally suitable include a water-starch mixture, fabric softener, ordinary laundry-sizing and mineral oil or castor oil. These materials are all characterized by providing a tacky surface upon application and will essentially volatalize at the temperature of the furnace. These latter materials are not considered as advantageous as the glycerine-water mixture because they are more expensive and are not as effective in creating porosity.

Following the application of the tacky adhesive layer, particles of hard carbide are simply physically sprinkled upon the surface thereof and are held in place adhesively. The thickness of the layer of particles may be varied by applying a thicker binder layer and by sprinkling on more particles.

The hard carbide particles 15 contemplated here are the usual cemented or sintered carbides formed conventionally of tungsten. These materials are commercially available for the purposes described above.

Carbide particles containing not only tungsten but also titanium, tantalum, molybdenum, and even small amounts of iron, nickel, cobalt and chromium may be used. The important features are (1) high hardness and (2) melting point well above the melting temperature of the matrix. Preferably the carbide particles will have a melting point above 2,500°F. for those matrix metals melting around 2,000°F.

Grit sizes for the carbide particles may range from 5 to 300 mesh depending on the ultimate use of the cutting tool. The grit may be essentially one size, e.g., 40 mesh, for a particular coating, rather than a wide size range of particles. However, the larger grit usually requires a greater tackiness or strength of adhesive binder.

Figure 5:
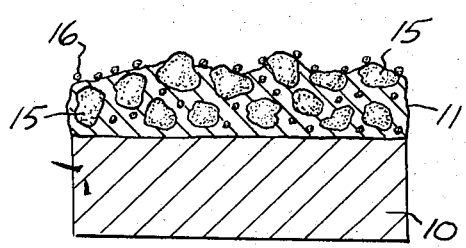
FIG. 5 shows the bonding step, such as by baking within a suitable furnace, wherein the matrix is melted and bonds to the particles, at the same time crystallizing the adhesive.
Figure 6:
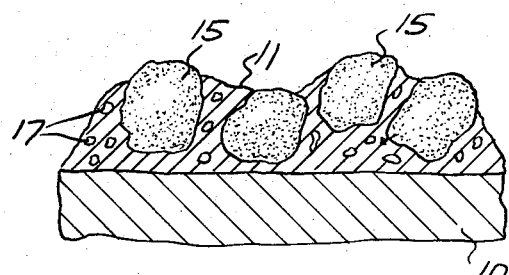
FIG. 6 shows an enlarged cross-sectional view illustrating schematically the porosity of the matrix.

The next step in the process is placing the layered substrate into a baking furnace which is maintained at a temperature high enough to melt the matrix and volatalize the temporary adhesive. The matrix material 11 has a flow capability, i.e., it tends to surround and thinly coat the carbide particles 15 which sink into the molten matrix as illustrated in FIG. 5. Simultaneously, the adhesive dries out or vaporizes and may form crystals 16, which tend to float to the surface or recrystallize on the surface. The crystals on the surface, as well as those trapped, cause porosity 17 in the solidified matrix (See FIG. 6). Those which form on the surface may be brushed after baking.

The temperature of the furnace must be maintained below the melting point of the substrate so as not to affect it, but since the baking time is short, e.g., roughly 15-20 minutes at roughly 1,950°F. to 2,050°F., the substrate is generally not affected by the baking.

The furnace may be provided with a reducing atmosphere, such as a primarily hydrogen-nitrogen atmosphere, which protects the carbide particles against oxidation and which reduces some oxidized portions of the matrix. By leaving some matrix oxides, hardness is maintained as it is some help towards creating porosity. The amount of oxides may vary considerably depending upon the desired results. Alternatively, a vacuum-type furnace may be preferred in certain applications. The primary requirement is that the furnace be non-oxidizing and protect the carbide particles against oxidation. The hydrogen in a reducing atmosphere furnace provides a decarburizing atmosphere which tends to anneal the oxides. Further, humidity may be a problem in reducing furnaces, especially on humid days. These problems are eliminated in a vacuum furnace. A vacuum of one to 150 microns is suitable in the furnace, however, the preferred range is from about 0.1 to 10 microns.

After baking, the coated substrate is cooled, resulting in the finished product.

The net result of this process is that the conventional copper brazing materials are eliminated altogether. The critical feature of the process is that it is not a copper brazing process and eliminates functional copper from the metal matrix.

Having fully described an operative embodiment of the invention, I now claim:

1. A process for applying cemented hard carbide particles to the surface of a metal substrate comprising:

applying metal matrix bonding layer essentially free of copper, in a molten form, upon the said metal substrate, the matrix being characterized by having a melting point around 2,000°F. and below the melting point of both the carbide particles and the metal substrate;

next applying a layer of a non-metallic tacky organic adhesive material that is essentially volatalizable in a non-oxidizing furnace, upon the surface of the said matrix;

then, loosely sprinkling the particles upon the layer of adhesive to form a layer of carbide particles held in place by the tacky adhesive;

next, baking the layered substrate in a furnace having a non-oxidizing atmosphere at a temperature below the melting point of the substrate, but high enough to essentially volatalize said adhesive and to melt the matrix to bond to the particles and to fuse the matrix to the substrate, and finally cooling the particle coated substrate.

2. A process as defined in claim 1, wherein said non-oxidizing furnace is a vacuum furnace having air atmosphere maintained between 0.1 and 100 microns.

3. A process as defined in claim 1, and said matrix being formed of an oxidizable metallic alloy, and spray applying said matrix by means of a hot oxygen-acetylene torch spray, thereby at least partly oxidizing the exposed surfaces of the matrix.

4. A process as defined in claim 3, and including applying a reducing atmosphere in said furnace and partially, but not completely, reducing said oxides.

5. A process as defined in claim 3, and said matrix being formed of a nickel-chrome ferrous metal alloy, with the nickel constituent particularly being oxidizable during the hot spray application.

6. A process as defined in claim 3, and said matrix being formed of an alloy containing an ingredient in the class of nickel, chromium, or cobalt, and being substantially free of copper, said ingredient being oxidizable at the temperature of said hot spray.

7. A process as defined in claim 2, wherein said adhesive comprises a glycerine-water mixture.

* * * * *